(12) United States Patent
Joshi et al.

(10) Patent No.: US 9,477,446 B1
(45) Date of Patent: Oct. 25, 2016

(54) BOTTOM-UP APPROACH FOR INTEGRATING MODELS FOR SOFTWARE COMPONENTS USING CONTRACTS

(71) Applicant: TOYOTA JIDOSHA KABUSHIKI KAISHA, Toyota-shi, Aichi-ken (JP)

(72) Inventors: Prachi Joshi, Falls Church, VA (US); Huafeng Yu, Cupertino, CA (US); Sandeep K. Shukla, Falls Church, VA (US); Jean-Pierre Talpin, Saint Grégoire (FR)

( * ) Notice: Subject to any disclaimer, the term of this patent is extended or adjusted under 35 U.S.C. 154(b) by 59 days.

(21) Appl. No.: 14/674,831

(22) Filed: Mar. 31, 2015

(51) Int. Cl.
*G06F 9/44* (2006.01)

(52) U.S. Cl.
CPC .. *G06F 8/35* (2013.01); *G06F 8/20* (2013.01)

(58) Field of Classification Search
None
See application file for complete search history.

(56) References Cited

U.S. PATENT DOCUMENTS 7,509,629 B2  3/2009  Sakamoto et al.
8,719,776 B2 *  5/2014  Eteminan ................. G06F 8/20
                                                        717/106
2002/0062475 A1 *  5/2002  Iborra ....................... G06F 8/30
                                                        717/108

FOREIGN PATENT DOCUMENTS

JP    02-039324      2/1990
JP    08-305554     11/1996
JP    2010198338 A   9/2010

* cited by examiner

*Primary Examiner* — Chuck Kendall
(74) *Attorney, Agent, or Firm* — Burbage Law, P.C.; Jon-Michael Burbage; Elizabeth Ruzich

(57) ABSTRACT

The disclosure includes a system and method for building an integrated system using a formal language. The method may include designing one or more models for one or more software components to be included in the integrated system. The one or more models may describe one or more requirements for the one or more software components. The method may include assigning one or more contracts written in the formal language to the one or more models. The method may include integrating the one or more models based on the composition of the one or more contracts to form an integrated model. The integrated model may include each requirement for the one or more software components. The method may include analyzing the one or more contracts and the integrated model to determine whether the one or more contracts include each requirement described by the integrated model.

20 Claims, 16 Drawing Sheets

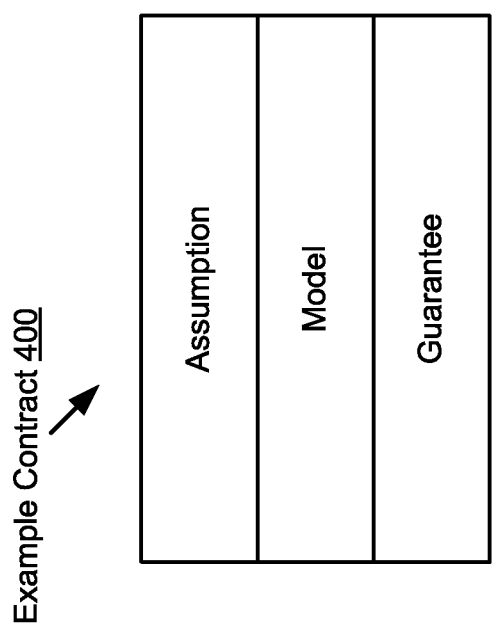

|             | SubModel1 | SubModel2 | SubModel12 | SubModel3 | Model1 |
|-------------|-----------|-----------|------------|-----------|--------|
| Performance | x1        | y1        | x1 + y1    | z1        | (x1 + y1)*z1 |
| Cost        | 10        | 15        | 25         | 20        | 500    |
| Performance | x2        | y2        | x2 + y2    | z2        | (x2 + y2)*z2 |
| Cost        | 12        | 18        | 30         | 30        | 900    |

Figure 7B

BOTTOM-UP APPROACH FOR INTEGRATING MODELS FOR SOFTWARE COMPONENTS USING CONTRACTS

BACKGROUND

The specification relates to integration of models for software components.

The design of embedded systems, including automotive systems, may be complex and unreliable. Some of the complexity of the design process is related to the ambiguity of the requirements between original equipment manufacturers (herein "OEM") and suppliers for the development of one or more software components to be integrated to form the embedded system. In other instances the complexity of the design process may be related to ambiguity of the interactions between the software components to be integrated to form the embedded system.

FIG. 1A is a block diagram illustrating a prior art process flow 101 consisting of a first user 105 providing a requirement specification 181 for a second user 106. The first user 105 may include an OEM. The second user 106 may include a supplier. The requirement specification 181 includes data or information which the first user 105 provides to the second user 106. The data or information included in the requirement specification 181 consists of a product development business plan written in a natural language or some other semi-formalized language. The second user 106 receives the requirement specification 181. The requirement specification 181 may be used at a later time by the second user 106 during the design process for the one or more software components to be integrated to form the embedded system.

SUMMARY

When designing embedded software, it is important to consider each parameter of the design prior to the actual design and implementation of the embedded software. This may be particularly true when designing embedded software for safety features included in vehicles or automobiles.

The software development process for embedded software may include integration of various components to form the embedded system. In any embedded software development process, the correct integration of the different software components of the embedded system to be designed is an important task to ensure the successful development of the embedded system. A common problem in such a scenario is the difficulty of ascertaining the most efficient and reliable method of integrating the various software components to form the integrated system. The severity of this problem is increased when the different software components included in the embedded system are provided by different suppliers. To avoid or reduce the severity of this problem, the compatibility of the software components included in the system may be determined prior to integration. The determination of the compatibility of the software components prior to beginning integration is an important step so that the software components are integrated in an efficient and reliable manner.

As described in FIG. 1A, existing approaches for integrating software components rely on a requirements specification. The requirement specifications is generally not formalized or standardized so that all parties involved in the development of the integrated system (i.e., the OEM and one or more suppliers) describe the software components and properties of the software components in a uniform way. This lack of standardization may result in ambiguity, uncertainty and integration errors. Moreover, the integration of the software components may occur after the implementation phase, which may increase the integration errors present in the embedded system.

One example solution that attempts to solve the problems present in existing approaches for integrating software components is AUTomotive Open System Architecture ("AUTOSAR"). AUTOSAR is widely used in the automobile industry. However, experience has shown that AUTOSAR is unable to solve the problems described above. OEMs and suppliers have been researching ways of solving these problems for years. However, their efforts have been unsuccessful. Accordingly, there is a longstanding industry need for a solution to these problems.

This disclosure describes embodiments for a method including a bottom-up approach for integrating models for software components using contracts. Although the subject matter of the disclosure is described herein with reference to building an embedded system, in practice the subject matter of the disclosure may be used to build any type of integrated software system.

Experimentation has shown that the subject matter described herein ensures reliable integration of one or more models of the software components. The subject matter described herein may include integration of one or more models of the software components. The integration of the one or more models of the software components may be based on one or more contracts which use a formal language. The formal language may include a standardized way of describing the software components and the properties for the software components. The formal language may be used by the OEM and the one or more suppliers. In some embodiments, the subject matter described herein may include a formal way of integrating one or more assume/guarantee contracts associated with one or more models of the system using a bottom-up approach.

The subject matter described herein may provide numerous benefits. For example, the subject matter may increase the reliability of the integrated system before the development phase. The subject matter may also reduce the complexity of the software development process by composing the component models ahead of time. In this way, the presence of design errors may be determined with greater lead time prior to production, thereby reducing the cost of the software development cycle.

This subject matter described herein may also provide a framework of unambiguous interaction between the OEM and the supplier (see, for example, FIG. 1B). For example, the OEM may share one or more models with the supplier. Using the subject matter described herein, the models provided to the supplier may be required to include one or more associated contracts at the time they are provided to the supplier. The combination of the one or more models and the one or more contracts associated with the one or more models may form a formal specification. The supplier may choose to use their own model design for production. However, the one or more models and the one or more contracts included in the formal specification, along with the framework of composition of the one or more contracts, describes the functional and non-functional requirements for the software components that must be designed by the supplier (and, optionally, other suppliers) using the formal language. In this way, the formal specification beneficially ensures that the OEM and the suppliers have the same understanding of how the embedded system and each software component integrated in the embedded system should be designed.

In some embodiments, each contract included in the subject matter described herein may include a set of one or more assume/guarantee conditions (see, for example, FIG. 4A). Each assume/guarantee condition included in the contract may be specified using the formal language. Each assume/guarantee condition may include data describing one or more requirements for one or more of the sub-components for a given software component or combination of software components. In this way, the one or more contracts included in the formal specification may describe each requirement of each of the sub-components forming each software component to be integrated to form the embedded system.

In some embodiments, the subject matter described herein applies a bottom-up approach when designing the embedded system. For example, the subject matter may include assigning contracts to one or more low-level component models and then integrating the sub-component contracts to obtain high-level contracts for the embedded system. The high-level contracts may include a direct manifestation of the high-level requirements of the components. The low-level contracts may be configured so that satisfying the lower-level contracts may ensure that the high-level contracts are satisfied (see, for example, FIG. 1D).

In some embodiments, the bottom-up approach for the integration of contracts as described herein may enable a user such as the OEM to specify all possible constraints to the models as required by the system.

In some embodiments, the bottom-up approach for the integration of contracts as described herein may provide a method to validate and verify the contracts on the system in a formal manner. This approach may also ensure the secrecy and confidentiality of the source code or actual model information of the OEM (or one or more suppliers) since each party only shares what is required by the other party in order to meet or satisfy the one or more models and the one or more contracts included in the formal specification (see, for example, FIG. 2).

In some embodiments, the one or more models and the one or more contracts included in the formal specification may be analyzed to determine one or more formal properties of the embedded system. The one or more properties may be used to model for different aspects of production. For example, the one or more properties may be used to model one or more of the following aspects of the embedded system: safety requirements; cost versus performance; and performance versus power consumption. Different examples of such modeling are described below with reference to FIGS. 6, 7A and 7B.

According to one innovative aspect of the subject matter described in this disclosure, a system and method for building an integrated system using a formal language. The method may include designing one or more models for one or more software components to be included in the integrated system. The one or more models may describe one requirements for the one or more software components. The method may include assigning one or more contracts written in the formal language to the one or more models. The method may include integrating the one or more models based on the composition of the one or more contracts to form an integrated model. The integrated model may include each requirement for the one or more software components which is described by the one or more models which form the integrated model. The method may include analyzing the one or more contracts and the integrated model to determine whether the one or more contracts include each requirement described by the integrated model.

Other aspects include corresponding methods, systems, apparatus, and computer program products.

BRIEF DESCRIPTION OF THE DRAWINGS

The disclosure is illustrated by way of example, and not by way of limitation in the figures of the accompanying drawings in which like reference numerals are used to refer to similar elements.

FIG. 4A is a block diagram including a contract, according to some embodiments.

FIG. 7B is a chart including a comparison of cost versus performance for an embedded system, according to some embodiments.

DETAILED DESCRIPTION

Figure 1A:
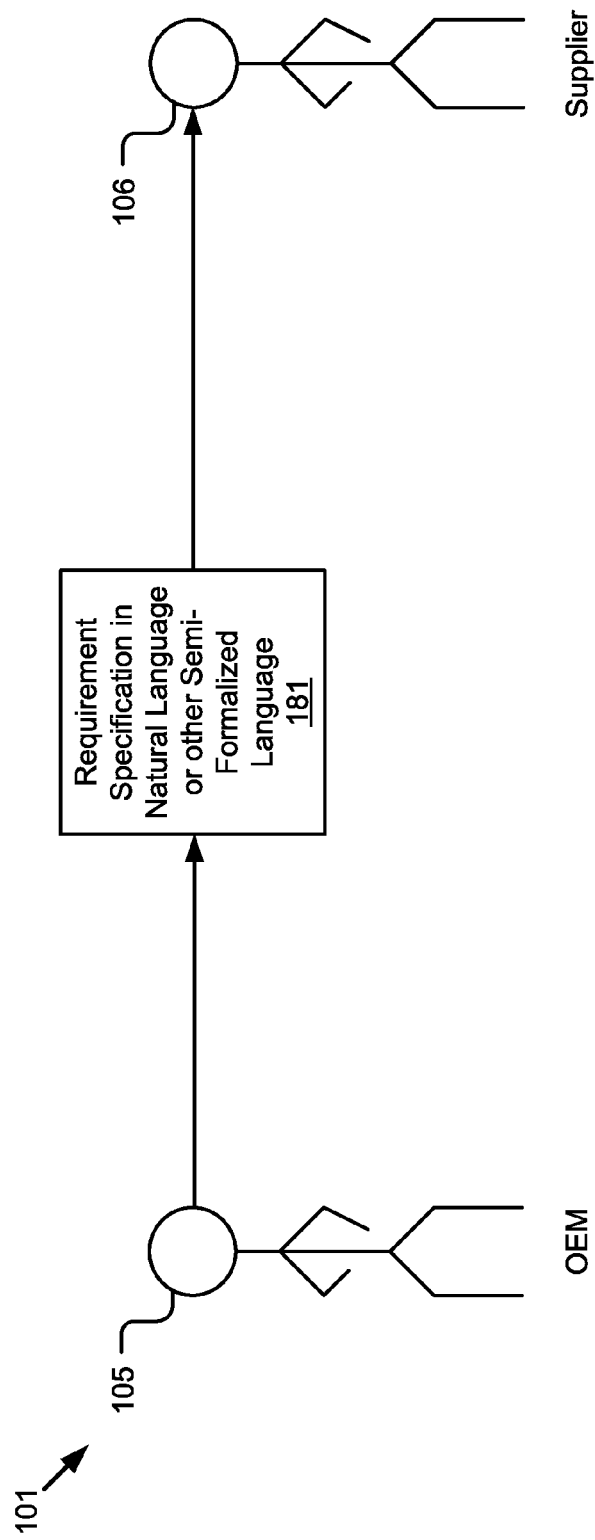
FIG. 1A is a block diagram illustrating a prior art process flow consisting of a first user providing a requirement specification for a second user.
Figure 1B:
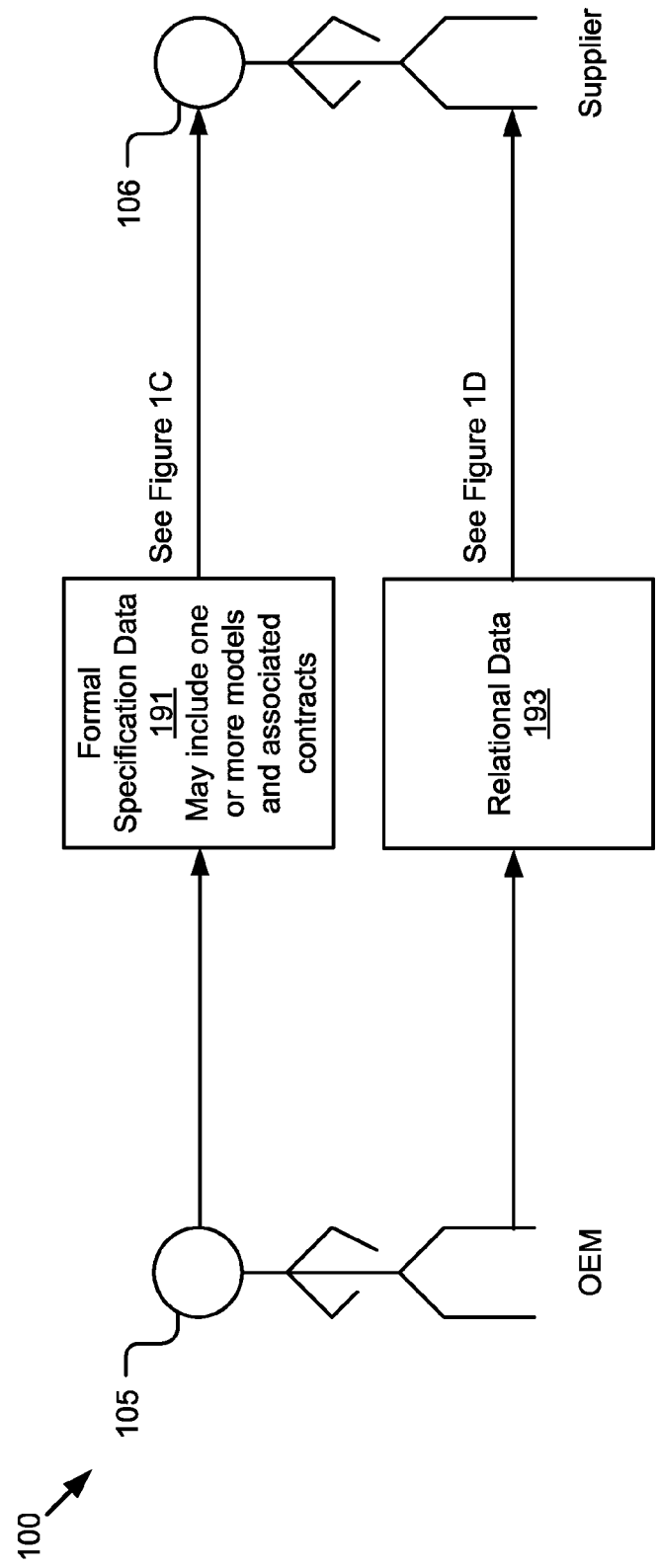
FIG. 1B is a block diagram illustrating a process flow including a first user providing formal specification data and relational data to a second user, according to some embodiments.

FIG. 1B is a block diagram illustrating a process flow 100 including a first user 105 providing formal specification data 191 and relational data 193 to a second user 106, according to some embodiments. Although the subject matter of the disclosure is described herein with reference to building an embedded system, in practice the subject matter of the disclosure may be used to build any type of integrated software system.

Although only one first user 105, one second user 106, one formal specification data 191 and one relational data 193 are depicted in FIG. 1B, in practice the process flow 100 may include one or more first users 105, one or more second users 106, one or more formal specification data units 191 and one or more relational data units 193.

The first user 105 may include an original equipment manufacturer (herein "OEM"). The second user 106 may include a supplier. The first user 105 may have employed the second user 106 to build one or more software components for an embedded system (or any other integrated software system). The first user 105 may provide the formal specification data 191 and the relational data 193 to the second user 106. The second user 106 may use the formal specification data 191 and the relational data 193 to design one or more software components. The one or more software components may be integrated to form the embedded system.

The formal specification data 191 may describe one or more models and one or more contracts. The one or more contracts may be associated with the one or more models. The one or more models and the one or more contracts included in the formal specification data 191 may form a formal specification.

The formal specification data 191 may describe the one or more models and the one or more contracts using a formal language. The formal language may include a standardized way of describing the software components and one or more properties for the software components. The formal language may be known by the first user 105 and the second user 106.

The formal specification data 191 may be used by the second user 106 when building the one or more software components. The formal specification data 191 may describe the functional and non-functional requirements for the one or more software components. The software components built using the formal specification data 191 may be integrated to form the embedded system.

The software components may include one or more sub-components. The relational data 193 may describe (1) one or more low-level contracts defining the contracts on models of the sub-components and (2) one or more high-level contracts defining the contracts associated with the models of the embedded system to be formed by the one or more software components.

Assume, for example, that the first user 105 is an OEM and the second user 106 is a supplier. The OEM may share one or more models with the supplier. The models may be described by the formal specification data 191. The models provided to the supplier may be required to include one or more associated contracts at the time they are provided to the supplier. The contracts may also be described by the formal specification data 191. The formal specification data 191 may describe the models and the contracts using a formal language. The combination of the one or more models and the one or more contracts associated with the one or more models may form a formal specification. The formal specification may be written using the formal language. The formal specification may be included in the formal specification data 191.

The supplier may choose to use their own model design for production of the one or more software components. However, the one or more models and the one or more contracts included in the formal specification data 191, along with the framework of composition of the one or more contracts, describes the functional and non-functional requirements for the software components that must be designed by the supplier (and, optionally, other suppliers) using the formal language. In this way, the formal specification data 191 beneficially ensures that the OEM and the suppliers have the same understanding of how the embedded system and each software component integrated in the embedded system should be designed.

In some embodiments, each contract described by the formal specification data 191 may include a set of one or more assume/guarantee conditions (see, for example, FIG. 4A). Each assume/guarantee condition included in the contract may be specified using the formal language. Each assume/guarantee condition may include data describing one or more requirements for one or more of the sub-components for a given software component or combination of software components. In this way, the one or more contracts included in the formal specification may describe each requirement of each of the sub-components forming each software component to be integrated to form the embedded system.

In some embodiments, the relational data 193 described herein may be configured to apply a bottom-up approach when designing the embedded system. For example, the relational data 193 may be configured to assign the low-level contracts to one or more low-level component models. The low-level contracts may be integrated to obtain the high-level contracts for the embedded system. The high-level contracts may include a direct manifestation of the high-level requirements of the components used to form the embedded system. The low-level contracts may be configured so that satisfying the low-level contracts may ensure that the high-level contracts are satisfied. An example of the high-level contracts and low-level contracts included in the relational data 193 are depicted below with reference to FIG. 1D.

One or more of the formal specification data 191 and the relational data 193 may be stored on a tangible or non-transitory storage medium. The storage medium may store instructions or data that may be executed by a processor device. The storage medium may include a dynamic random access memory (DRAM) device, a static random access memory (SRAM) device, flash memory, or some other memory device. In some embodiments, the storage medium also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The formal specification data 191 is described in more detail below with reference to FIG. 1C. The relational data 193 is described in more detail below with reference to FIG. 1D.

Figure 1C:
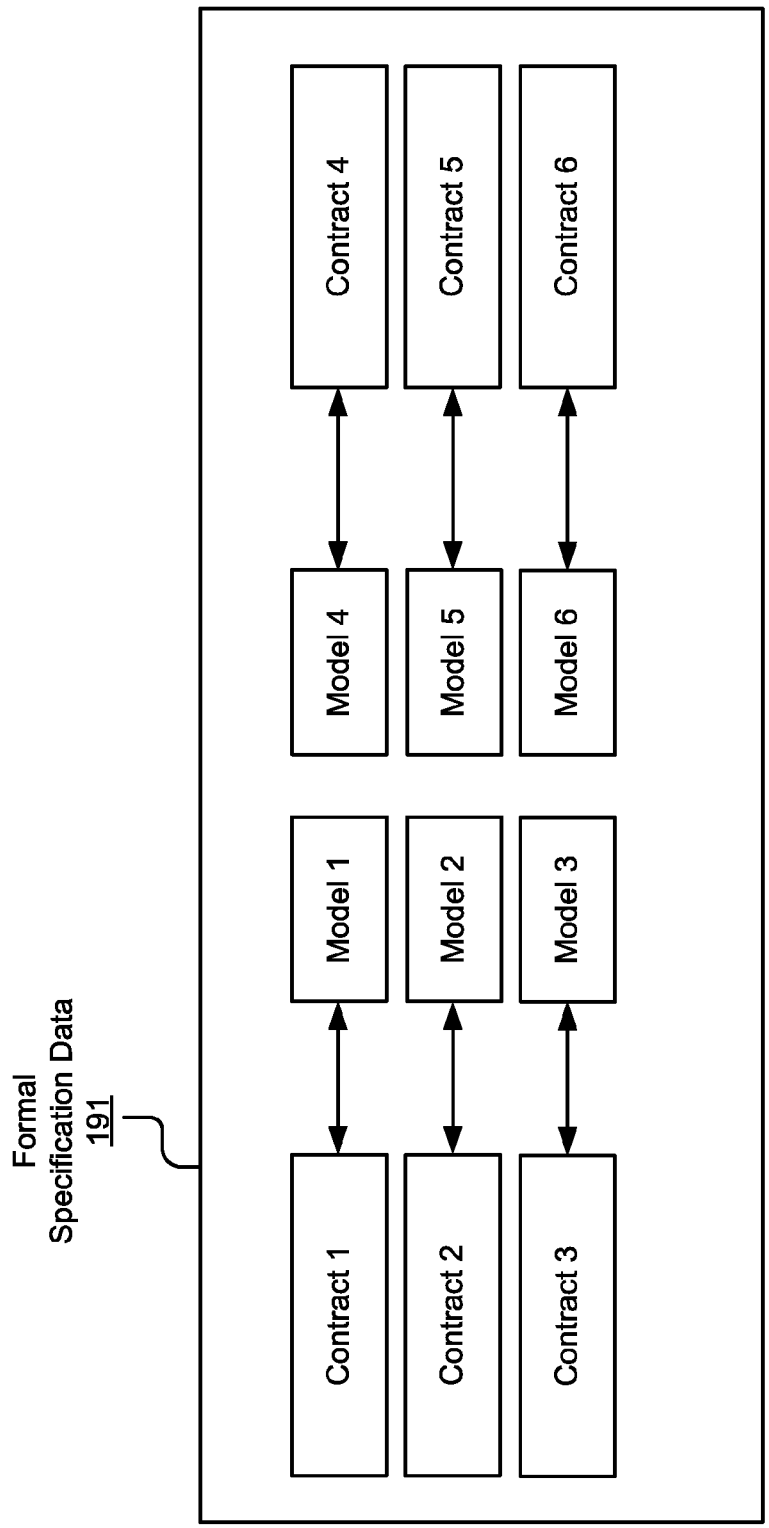
FIG. 1C is a block diagram illustrating an example of formal specification data, according to some embodiments.

FIG. 1C is a block diagram illustrating an example of the formal specification data 191, according to some embodiments. This example is presented for illustration purposes only, and not intended to be limiting.

The example depicts the formal specification data 191 including six models: model 1; model 2; model 3; model 4; model 5; and model 6. Each model is associated with a different contract. The different contracts include: contract 1; contract 2; contract 3; contract 4; contract 5; and contract 6. The two-way arrows between each model and each contract represents the association between the respective models and contracts. For example, model 1 is associated with contract 1, model 2 is associated with contract 2, model 3 is associated with contract 3, model 4 is associated with contract 4; model 5 is associated with contract 5, and model 6 is associated with contract 6.

Figure 1D:
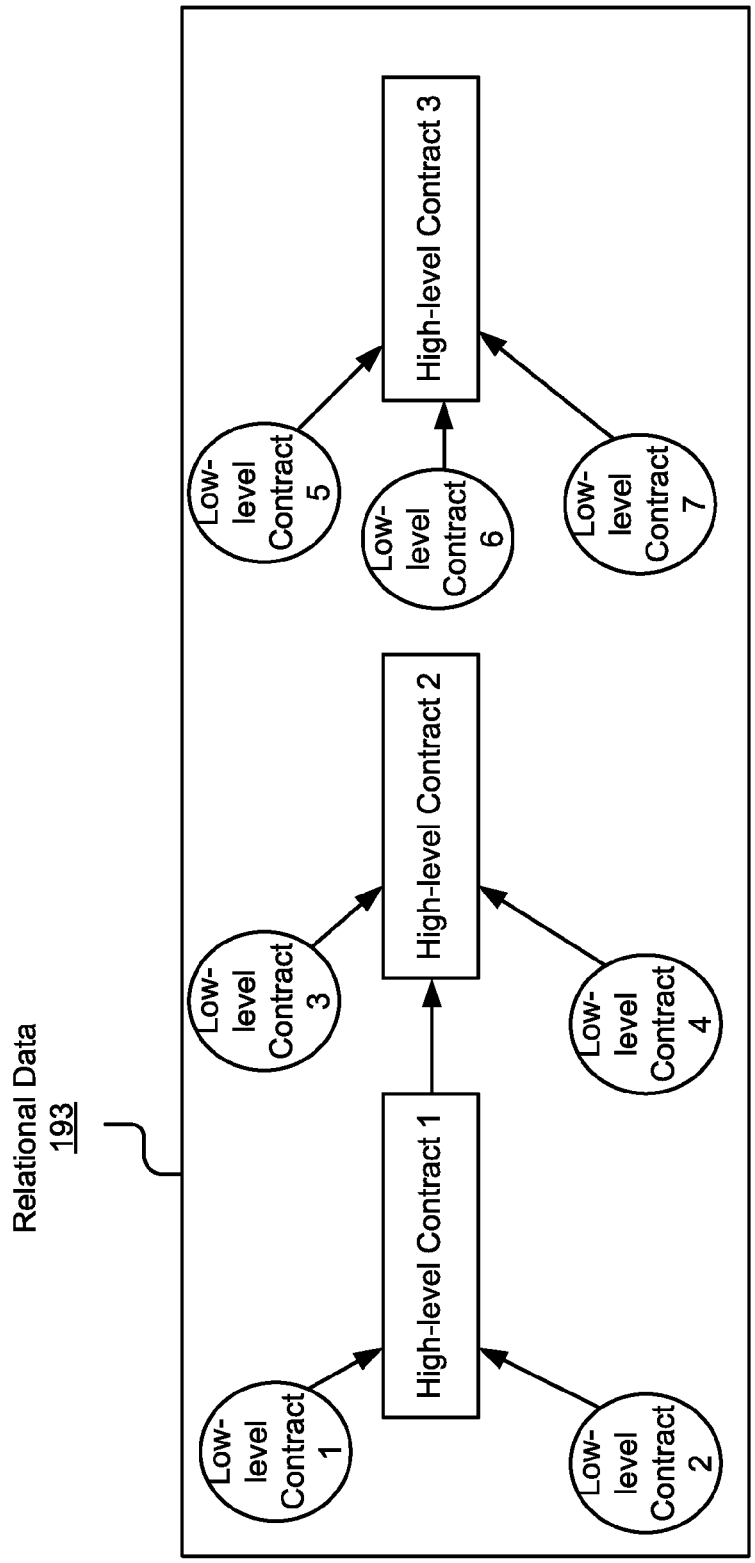
FIG. 1D is a block diagram illustrating an example of relational data, according to some embodiments.

FIG. 1D is a block diagram illustrating an example of the relational data 193, according to some embodiments. This example is presented for illustration purposes only, and not intended to be limiting.

The example depicts three high level contracts: high-level contract 1; high-level contract 2; and high-level contract 3. High-level contract 1 is associated with low-level contract 1 and low-level contract 2. High-level contract 2 is associated with low-level contract 3 and low-level contract 4. High-level contract 3 is associated with low-level contract 5, low-level contract 6 and low-level contract 7.

The low-level contracts (i.e., low-level contract 1, low-level contract 2, low-level contract 3, low-level contract 4, low-level contract 5, low-level contract 6 and low-level contract 7) may describe the the contracts on models of the sub-components of a software component.

The high-level contracts (i.e., high-level contract 1, high-level contract 2 and high-level contract 3) may describe the contracts associated with the models of the embedded system to be formed by the one or more software components.

In some embodiments, the example of the relational data 193 depicted in FIG. 1D may be configured to apply a bottom-up approach when designing the embedded system. For example, the relational data 193 may be configured to assign the low-level contracts to one or more low-level component models. The low-level contracts may be integrated to obtain the high-level contracts for the embedded system. The high-level contracts may include a direct manifestation of the high-level requirements of the components used to form the embedded system. The low-level contracts may be configured so that satisfying the low-level contracts may ensure that the high-level contracts are satisfied.

Figure 2:
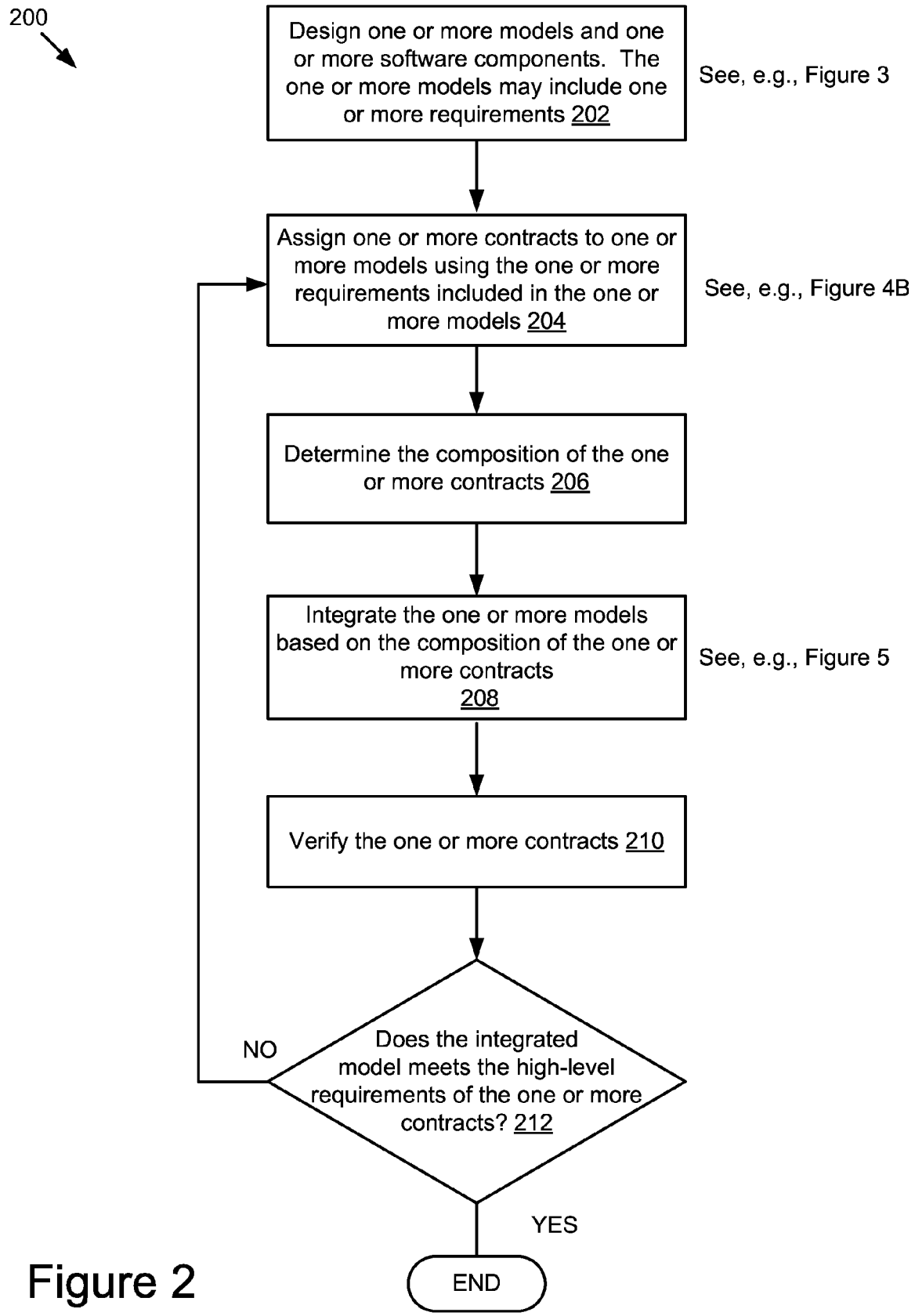
FIG. 2 is a flowchart of an example method including a bottom-up approach for integrating models for software components using contracts, arranged according to some embodiments.

FIG. 2 is a flowchart of an example method 200 including a bottom-up approach for integrating models for software components using contracts, arranged according to some embodiments.

At block 202, one or more models and one or more software components may be designed. The one or more models may include one or more requirements for the one or more software components. For example, the one or more models may describe one or more functional or non-functional requirements for the one or more software components. The one or more software components may be integrated to form an embedded system. The one or more models may be described using a formal language. An example of block 202 is described below with reference to FIG. 3.

At block 204, one or more contracts may be assigned to the one or more models. The one or more contracts may be assigned to the one or more models using the one or more requirements included in the one or more models. The one or more contracts may be described using a formal language. An example of a contract is described below with reference to FIG. 4A. An example of block 204 is described below with reference to FIG. 4B.

At block 206, the composition of the one or more contracts may be determined.

At block 208, the one or more models may be integrated based on the composition of the one or more contracts. An example of block 208 is described below with reference to FIG. 5.

At block 210, the one or more contracts may be verified. The one or more contracts may include high-level contracts and low-level contracts.

For example, the one or more contracts may be verified using a formal verification method. Verifying the one or more contracts using a formal verification method may include determining whether each contract satisfies the properties it promises to guarantee if the assumed pre-conditions included in the contract exist. In this way, the one or more contracts are a reflection of the requirements on the one or more models.

At block 212, a determination may be made regarding whether the integrated model meets the high-level requirements of the one or more contracts. If the integrated model does not meet the high-level requirements of the one or more contracts, then the method 200 returns to block 204. If the integrated model does meet the high-level requirements of the one or more contracts, then the method 200 may end.

For example, if the integrated model does not meet the high-level requirements of the one or more contracts at block 212, the method 200 returns to block 204. At block 204, the one or more contracts may be revised to modify the requirements of the one or more contracts (or add additional requirements to the one or more contracts) so that the one or more contracts may include all the requirements included in the model. This process may continue interactively until the requirements for a component or subcomponent (as indicated by their associated model) are included in the one or more contracts (which are associated with the models for those components or subcomponents).

Figure 3:
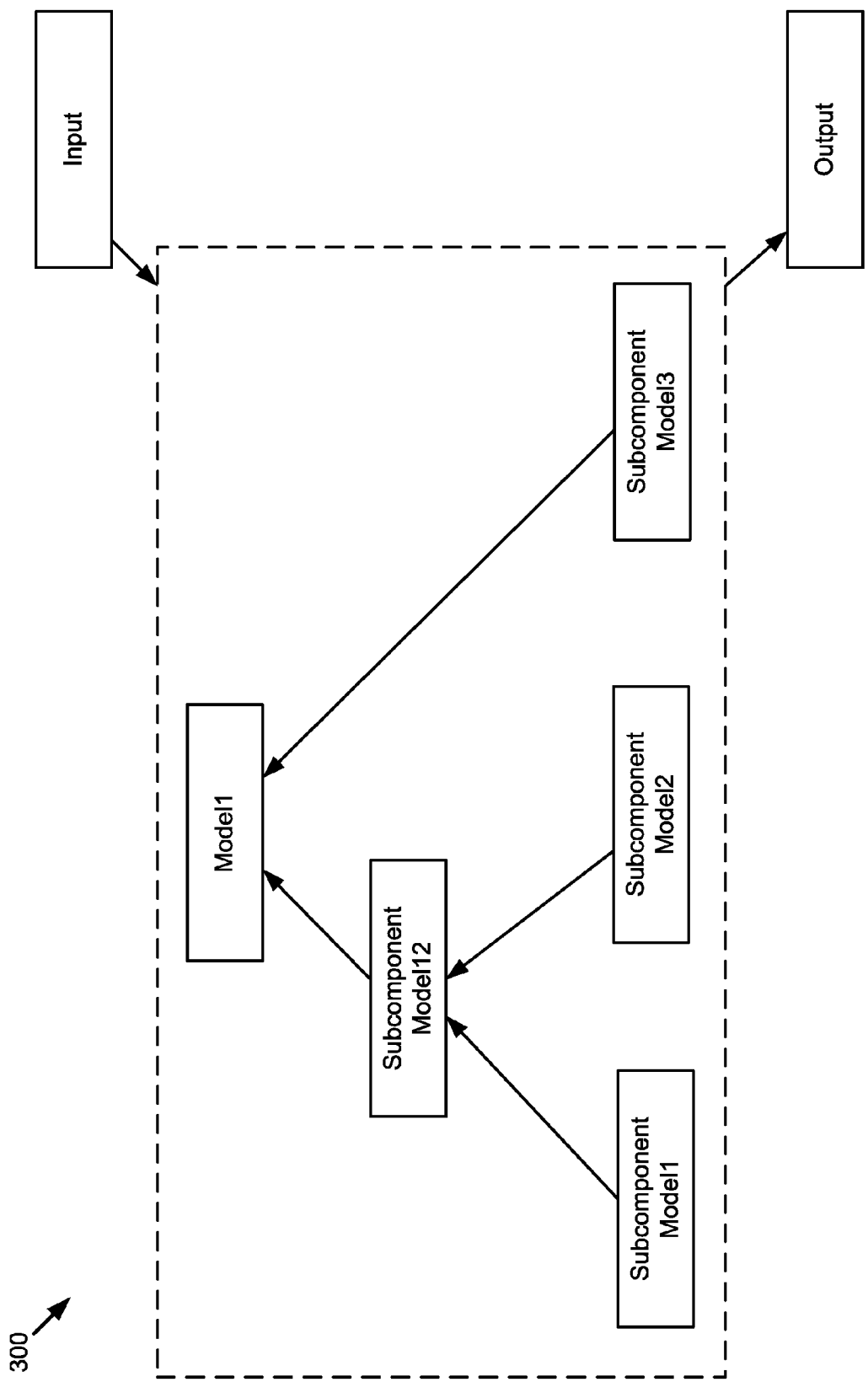
FIG. 3 is a block diagram including an example of designing one or more models and one or more software components, according to some embodiments.

FIG. 3 is a block diagram including an example 300 of designing one or more models and one or more software components, according to some embodiments. The model of an embedded system may be designed using a model-based design approach. The model of the embedded system may be created in one of a various domains, including, for example: architecture; behavior; safety; performance; cost; etc.

This example 300 includes a model design for an embedded system including an input and an output. In this example 300, the model is "Model1." The model for the embedded system may include various sub-components. In this example 300, Model1 includes the following sub-components: "subcomponent model12" and "subcomponent model3." Additionally, any subcomponent may include its own subcomponents. In this example, subcomponent model12 includes the following sub-components: "subcomponent model1" and "subcomponent model2."

FIG. 4A is a block diagram including an example 400 of a contract, according to some embodiments. In this example 400, the contract describes one or more assumptions, one or more models and one or more guarantees. The model included in the contract may describe one or more functional or non-functional requirements for a software component or subcomponent of a software component. The one or more assumptions may state one or more pre-conditions for the model in one or more domains (e.g., safety, performance, function, etc). The one or more guarantees may state one or more post-conditions for the model in the one or more domains. The one or more assumptions, one or more models and one or more guarantees may be described using a formal language and not a natural language (e.g., English)

Figure 4B:
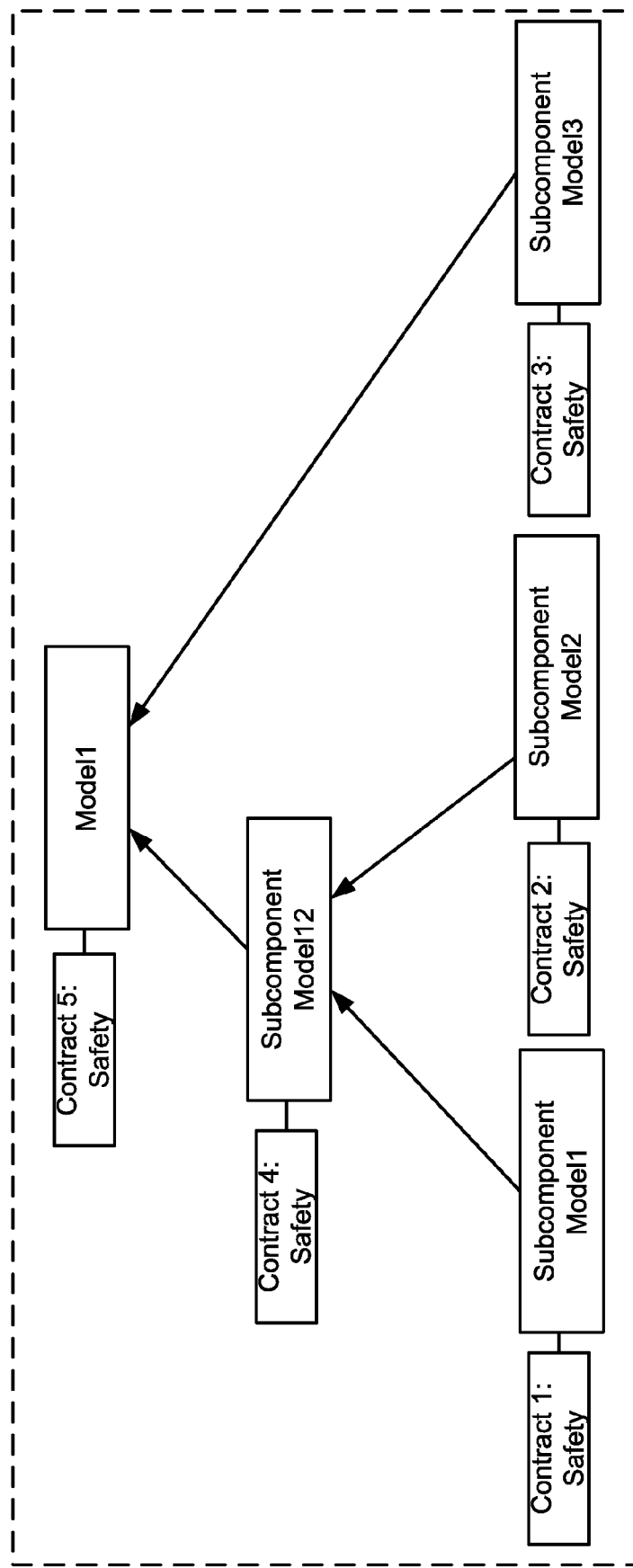
FIG. 4B is a block diagram including an example of assigning one or more contracts to one or more models using one or more requirements included in the one or more models, according to some embodiments.

FIG. 4B is a block diagram including an example 401 of assigning one or more contracts to one or more models using one or more requirements included in the one or more models, according to some embodiments.

Each sub-component of the model may be associated with its own contract. Each subcomponent may be assigned its own functional or non-functional requirements. The requirements for a given subcomponent may depend on various aspects of the subcomponent, including, for example: the function of the subcomponent; the capability of the subcomponent; the cost of the subcomponent.

The requirements for each subcomponent may be stated in the contract for that subcomponent. The contract may describe one or more assumptions that state one or more pre-conditions for the model in one or more domains (e.g., safety, performance, function, etc.). The The contract may also describe one or more guarantees that state one or more post-conditions for the model in the one or more domains. The contracts for the subcomponents may be described in the same formal language used for the contracts associated with the software components.

In some embodiments, the contracts for the subcomponents may be used to specify safety properties which cannot be unambiguously described or verified using a natural language (e.g., English).

FIG. 4B is a continuation of FIG. 3 and includes the same model and subcomponents described above with reference to FIG. 3. The domain described by the contracts in this example 401 is "safety." Subcomponent model1 is associated with contract 1. Subcomponent model2 is associated with contract 2. Subcomponent model3 is associated with contract 3. Subcomponent model12 is associated with contract 4. Model 1 is associated with contract 5.

Figure 5:
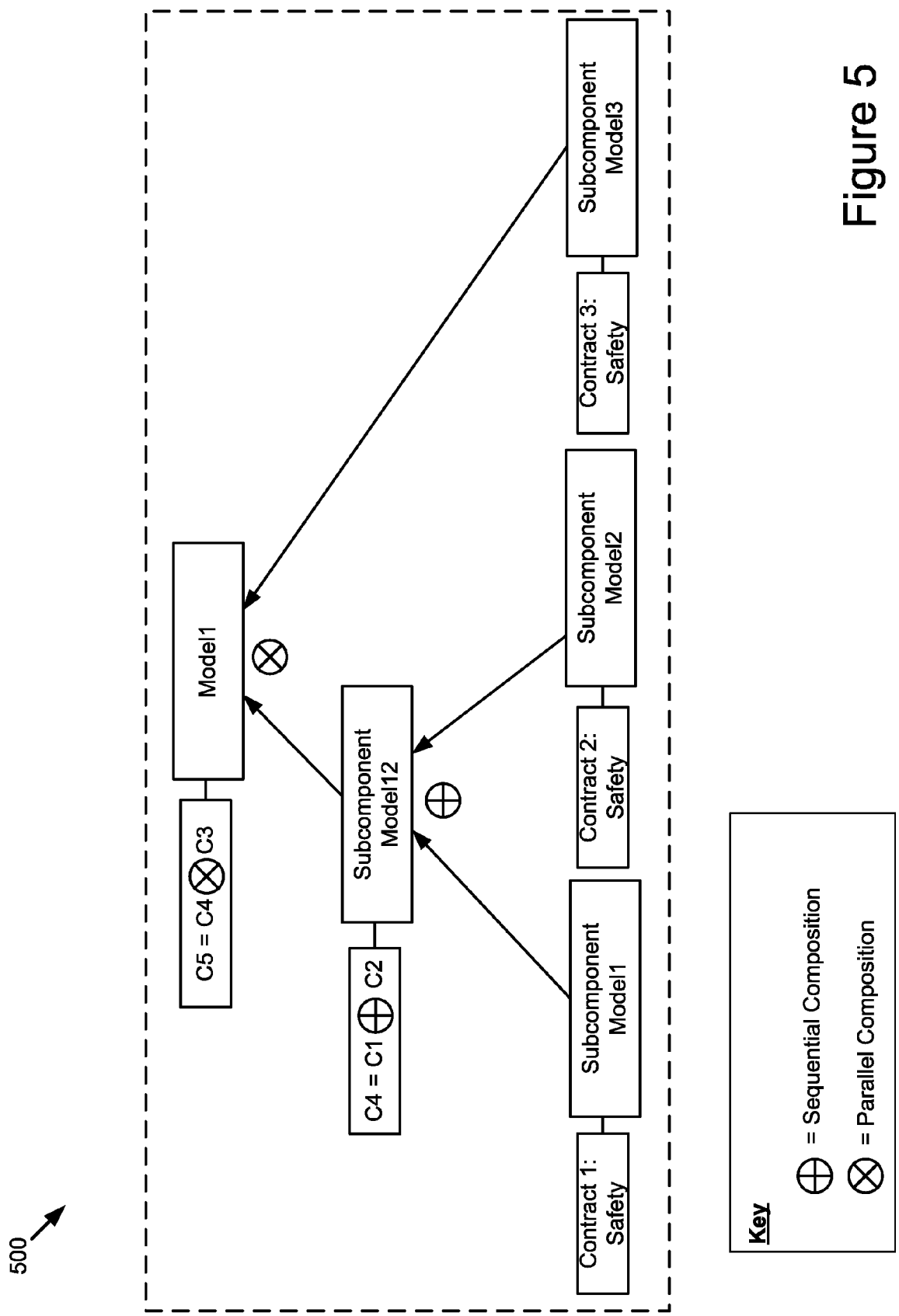
FIG. 5 is a block diagram including an example of integrating one or more models based on the composition of one or more contracts, according to some embodiments.

FIG. 5 is a block diagram including an example 500 of integrating one or more models based on the composition of one or more contracts, according to some embodiments.

The framework for the integration of the assigned contracts may be designed such that it provides the high-level contracts by a method of composition indicated by the low-level contracts. In this way, the high-level contracts may be validated and verified based on whether the low-level contracts have been satisfied.

The method of composition may be based on an appropriate formalism. One example formalism which may be used includes interface automata. Interface automata may include a light-weight formalism used to capture one or more interfaces for software components. The pre-conditions and post-conditions defined for the contracts may use the interfaces of the components to analyze the composability of the contracts.

There are two composition types into which composition operators may be categorized. The first composition type is "sequential composition," which is represented in FIG. 5 using the symbol "⊕" and composes the models in series with one another. The second composition type is "parallel composition," which is represented by the symbol "⊗" and composes the models which are in a hierarchy.

FIG. 5 is a continuation of FIG. 4B and includes the same model and subcomponents described above with reference to FIG. 4B. In FIG. 5, contract 4 is now represented by the symbol "C4" and contract 5 is now represented by the symbol "C5." Contract 4 indicates that subcomponent model1 is sequentially composed with subcomponent model2. Contract 5 indicates that Model1 is a parallel composition of subcomponent model12 and subcomponent model3.

After the one or more models are integrated based on the composition of the one or more contracts associated with those models, the contracts themselves may be verified. For example, with reference to FIG. 5, if a contract indicates that contract 2 does not satisfy its post-conditions, then the method expects to identify errors in the higher level contracts which may be influenced by contract 2 (e.g., contract 4 and contract 5).

Figure 6:
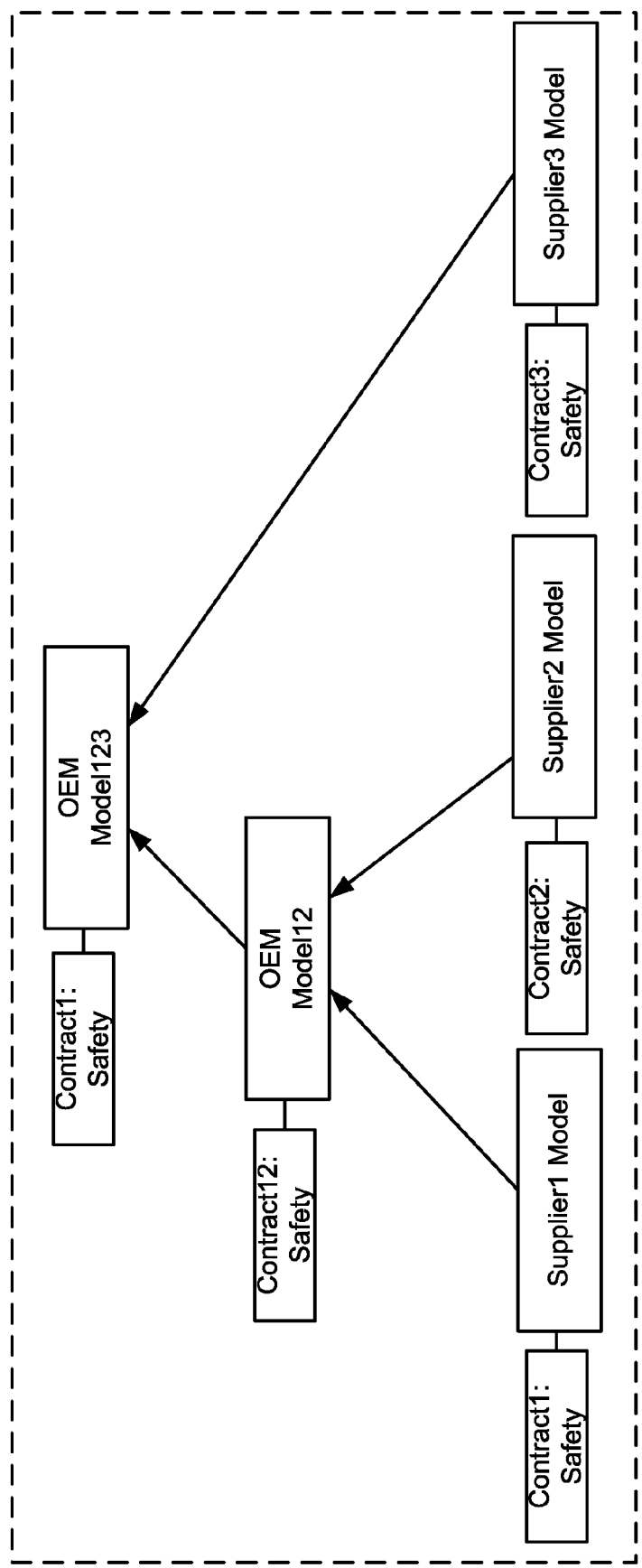
FIG. 6 is a block diagram including an example use case for verifying the correctness of an embedded system, according to some embodiments.

FIG. 6 is a block diagram including an example use case 600 for verifying the correctness of an embedded system, according to some embodiments. In this example use case 600, models from different suppliers are integrated. The different suppliers include "supplier1," "supplier2" and "supplier3." The different suppliers may provide components to the OEM for the development of a system. The system may include an embedded system or any integrated system. Experimentation has shown that this approach is useful for the integration of the components by the OEM and to verify the correctness of the system. This approach is also useful to check the compatibility of the different models from various suppliers and the safety properties of the system before simulation and development since each of the contracts are expressed in the same formal language.

Figure 7A:
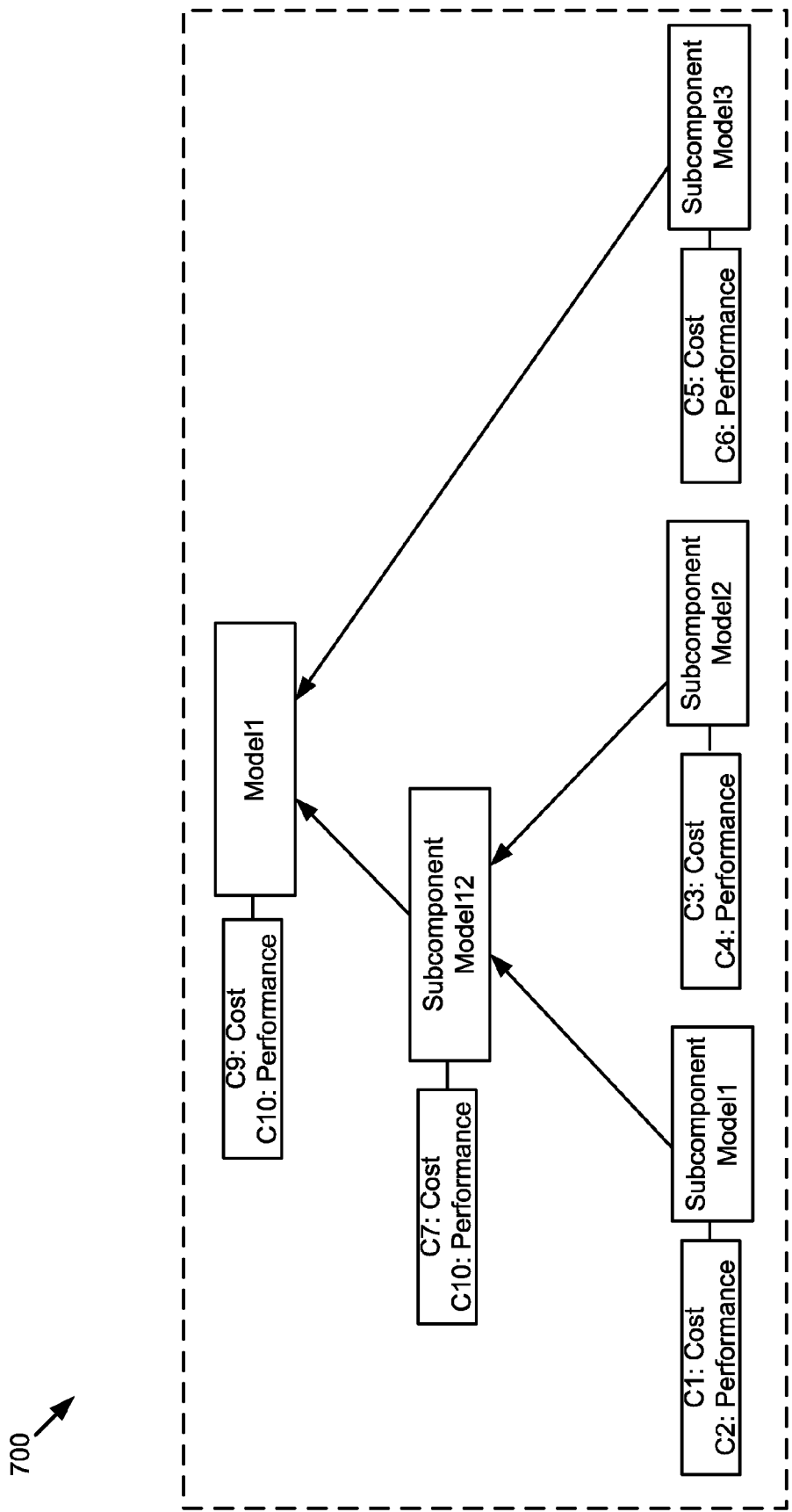
FIG. 7A is a block diagram including an example use case for comparing one or more aspects of an embedded system, according to some embodiments.

FIG. 7A is a block diagram including an example use case 700 for comparing one or more aspects of an embedded system, according to some embodiments. FIG. 7B is a chart 701 including a comparison 701 of cost versus performance for the use case 700 depicted in FIG. 7A. Accordingly, FIGS. 7A and 7B will be described together.

With reference to FIG. 7A, the supplier or OEM may use the approach for comparing various aspects like safety versus performance or cost versus performance. The supplier or OEM may decide how to design or redesign the system based on an analysis of the comparison. For example, varying C1 may change C2, and vice versa. The variation in the specific values of the contracts of the sub-components (C1, C2, C3, C4, C5, C6) would be reflected in the high-level contracts (C9 and C10). Thus we get several cases for comparing the models based on their desired aspects of consideration. For example, by varying C1 we may get different values on C2 and correspondingly on C9 and C10. This could be a useful analysis to decide the trade-off between the cost and performance for the designed component With reference to FIG. 7B, the example chart 701 is based on the use case 701 shown in FIG. 7A.

Figure 8A:
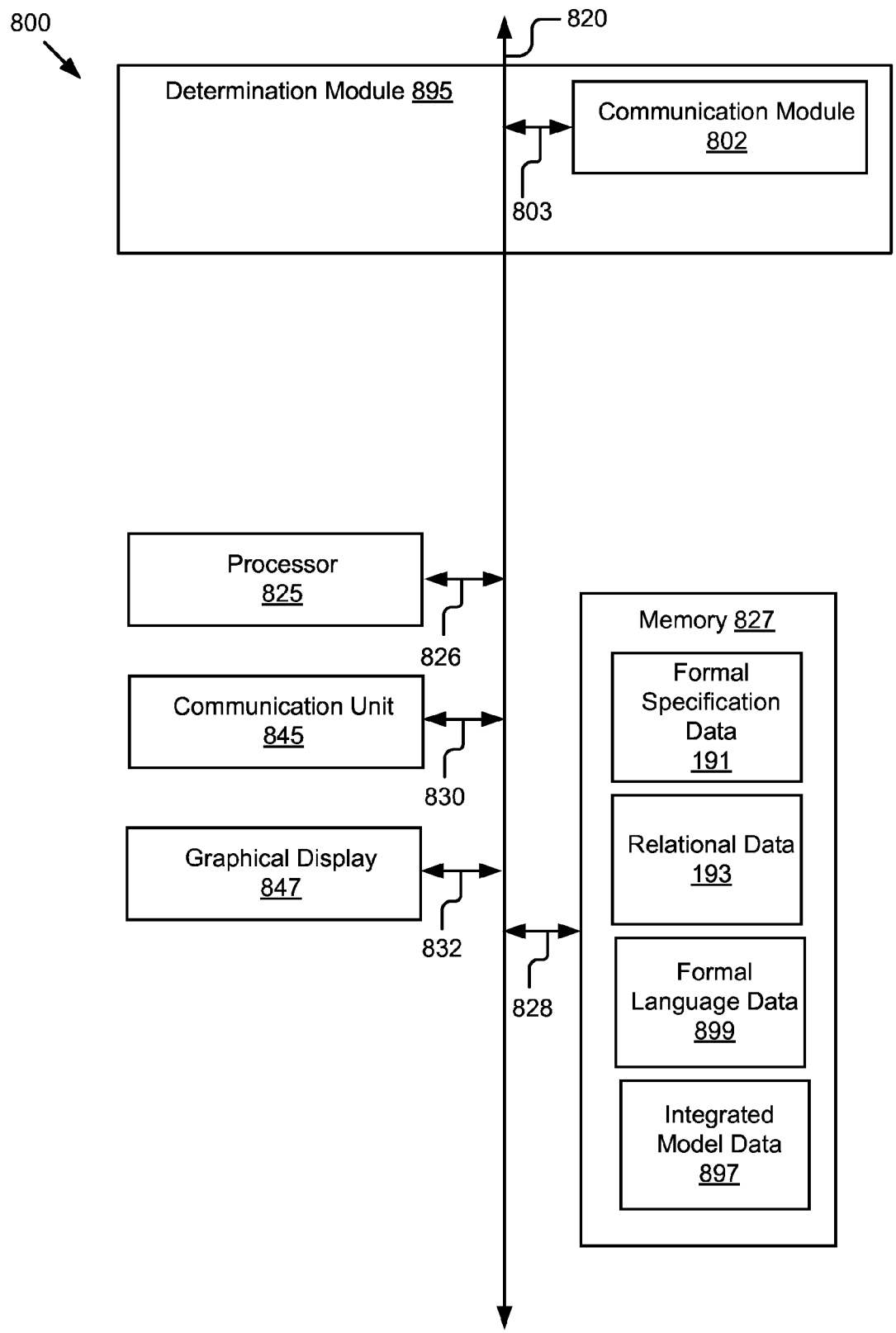
FIG. 8A is a block diagram including a system for building an integrated system using a formal language.

FIG. 8A is a block diagram illustrating an example system 800 for building an integrated system using a formal language. The system 800 may include an electronic device. The electronic device may be configured or programmed to provide some or all of the functionality described above with reference to FIGS. 1B-1D, 2, 3, 4A, 4B, 5, 6, 7A and 7B. In some implementations, the system 800 may include a special-purpose computing device configured to provide some or all of the functionality described above with reference to FIGS. 1B-1D, 2, 3, 4A, 4B, 5, 6, 7A and 7B. For example, the special-purpose computer device may be programmed to execute one or more blocks of FIG. 2.

The system 800 may include a determination module 895, a processor 825, a memory 827, a communication unit 845 and a graphical display 847, according to some examples. The determination module 895 includes a communication module 802. The components of the system 800 are communicatively coupled by a bus 820. The bus 820 may include a common electronic communicative coupling between the elements of the system 800.

The processor 825 includes an arithmetic logic unit, a microprocessor, a general-purpose controller, or some other processor array to perform computations and provide electronic display signals to a display device. The processor 825 processes data signals and may include various computing architectures including a complex instruction set computer (CISC) architecture, a reduced instruction set computer (RISC) architecture, a graphic processor unit (GPU) architecture or an architecture implementing a combination of instruction sets. Although FIG. 8 includes a single processor 825, multiple processors 825 may be included. Other processors, operating systems, sensors, displays, and physical configurations may be possible. In some implementations, the processor 825 is programmed to perform one or more blocks of the method 200 described above with reference to FIG. 2. The processor 825 is coupled to the bus 820 for communication with the other components via signal line 826.

The memory 827 stores instructions or data that may be executed by the processor 825. The instructions or data may include code for performing the techniques described herein. The memory 827 may include a dynamic random access memory (DRAM) device, a static random access memory (SRAM) device, flash memory, or some other memory device. In some implementations, the memory 827 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 827 is coupled to the bus 820 for communication with the other components via signal line 828.

As illustrated in FIG. 8, the memory 827 stores the formal specification data 191, the relational data 193, formal language data 899 and integrated model data 897. The memory 827 may also store other data for providing the functionality described herein. The formal specification data 191 and the relational data 193 were described above with reference to one or more of FIGS. 1B-1D, 2, 3, 4A, 4B, 5, 6, 7A and 7B, and so, these descriptions will not be repeated here.

The formal language data 899 may describe one or more rules or a grammar defining the formal language which is used to describe one or more of the formal specification data 191 and the relational data 193.

The integrated model data 897 may describe the integrated model that may result from the execution of block 208 described above with reference to FIG. 2 and FIG. 5.

The system 800 may be communicatively coupled to a network 805 described below with reference to FIG. 8B. The communication unit 845 is coupled to the bus 820 via a signal line 830.

In some implementations, the communication unit 845 includes a port for direct physical connection to the network 805 or to another communication channel. For example, the communication unit 845 includes a USB, SD, CAT-5, or similar port for wired communication with other entities in the system 870 described below with reference to FIG. 8B. In some implementations, the communication unit 845 includes a wireless transceiver for exchanging data with other entities in the system 870 or other communication channels using one or more wireless communication methods, including IEEE 802.11, IEEE 802.16, Bluetooth®, or another suitable wireless communication method.

In some implementations, the communication unit 845 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. The communication unit 845 may also provide other conventional connections to the network 805 for distribution of files or media objects using standard network protocols including TCP/IP, HTTP, HTTPS, and SMTP, etc.

The graphical display 847 includes an electronic display for depicting graphical data related to the data stored on the memory 827. For example, the graphical display 847 may depict chart 701. The graphical display 847 is communicatively coupled to the bus 820 via communication line 832.

In some implementations, the determination module 895 may include a code and routines executable by the processor 825 to provide the functionality described above with reference to FIGS. 1B-1D, 2, 3, 4A, 4B, 5, 6, 7A and 7B. In some other implementations, the determination module 895 may be in the memory 827 and may be accessible and executable by the processor 825 of the system 800. The determination module 895 may be adapted for cooperation and communication with the processor 825 and other components of the system 800.

The communication module 802 may include software including routines for handling communications between the determination module 895 and other components of the system 800. In some implementations, the communication module 802 can include a set of instructions executable by the processor 825 to provide the functionality described below for handling communications. The communication module 802 may be communicatively coupled to the bus 820 via signal line 803.

The communication module 802 sends and receives data, via the communication unit 845, to and from one or more of entities of the system 870 described below with reference to FIG. 8B. For example, the communication module 802 receives, via the communication unit 845, the formal specification data 191 and the relational data 193 from a system operable by the first user 105.

In some implementations, the communication module 802 receives data from components of the system 800 and stores the data in the memory 827. In some implementations, the communication module 802 retrieves data from the memory 827 and sends the data to one or more components of the system 800. In some implementations, the communication module 802 may handle communications between components of the system 800.

Figure 8B:
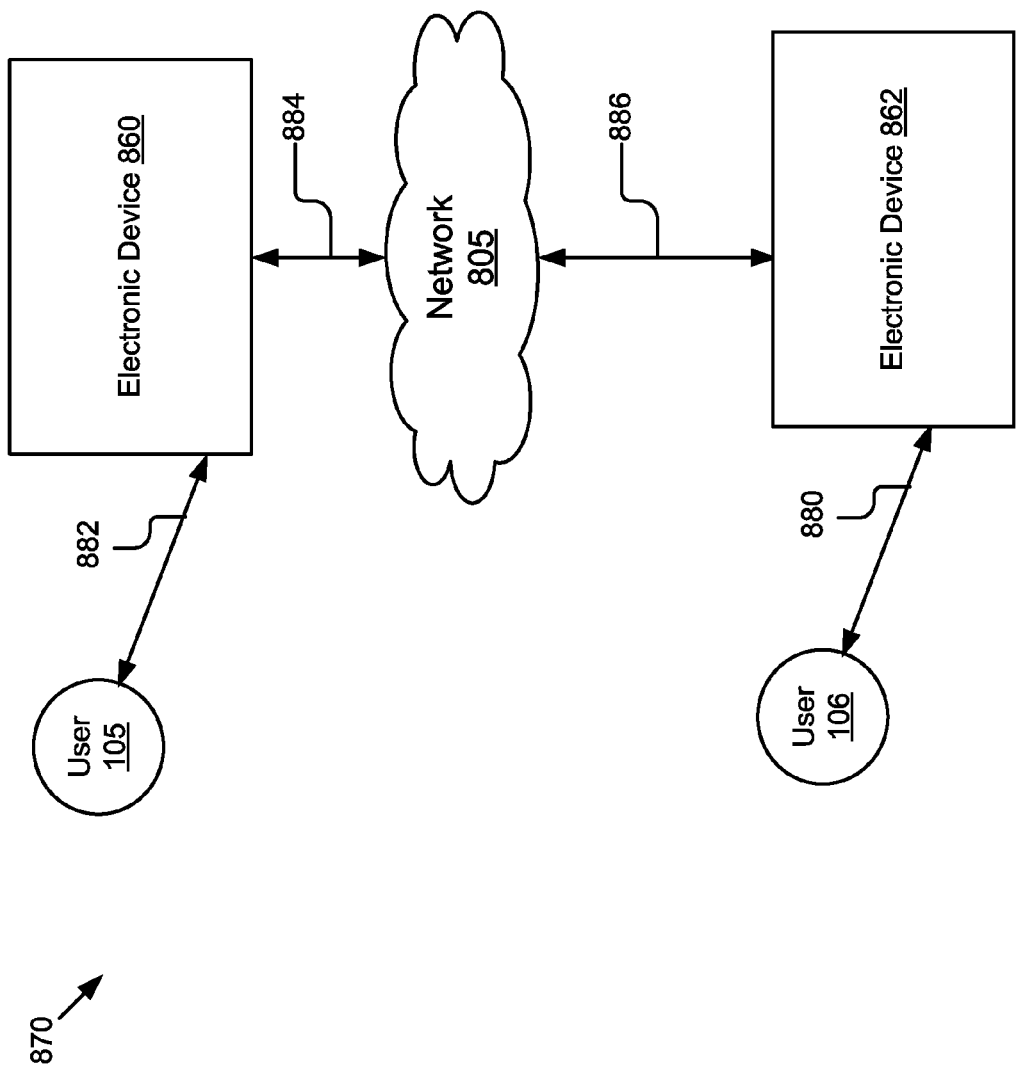
FIG. 8B is a block diagram including a system for a first user to provide formal specification data and the relational data to a second user via a network.

Turning now to FIG. 8B. FIG. 8B illustrates a block diagram of some implementations of a system 870 for the first user 105 to provide the formal specification data 191 and the relational data 193 to the second user 106 via a network 805. The system 870 includes a first electronic device 860 communicatively coupled to the network 805 via signal line 884 and a second electronic device 862 communicatively coupled to the network 805 via signal line 886. Signal line 882 indicates that the first electronic device 860 is operable by the first user 105. Signal line 880 indicates that the second electronic device 862 is operable by the second user 106. The first user 105 and the second user 106 were described above with reference to FIG. 1B, and so, those descriptions will not be repeated here. The first electronic device 860 and the second electronic device 862 may include hardware and functionality similar to the system 800 described above with reference to FIG. 8A, and so, that description will not be repeated here.

While FIG. 8B illustrates one first user 105, one second user 106, one first electronic device 860, one second electronic device 862 and one network 805, the disclosure applies to a system 870 architecture including one or more first users 105, one or more second users 106, one or more first electronic devices 860, one or more second electronic devices 862 and one or more networks 805.

The network 805 can include a conventional type, wired or wireless, and may have numerous different configurations including a star configuration, token ring configuration, or other configurations. Furthermore, the network 805 may include a local area network (LAN), a wide area network (WAN) (e.g., the Internet), or other interconnected data paths across which multiple devices may communicate. In some implementations, the network 805 may be a peer-to-peer network. The network 805 may also be coupled to or include portions of a telecommunications network for sending data in a variety of different communication protocols. In some implementations, the network 805 includes Bluetooth® communication networks or a cellular communications network for sending and receiving data including via short messaging service (SMS), multimedia messaging service (MMS), hypertext transfer protocol (HTTP), direct data connection, WAP, e-mail, etc. In some implementations, the network 805 may include a global positioning system (GPS) satellite. The network 805 may be a mobile data network, for example, 3G, 4G, LTE, Voice-over-LTE ("VoLTE"), or any other mobile data network or combination of mobile data networks. In some implementations, the network 805 may be a combination of different networks.

Figure 9A:
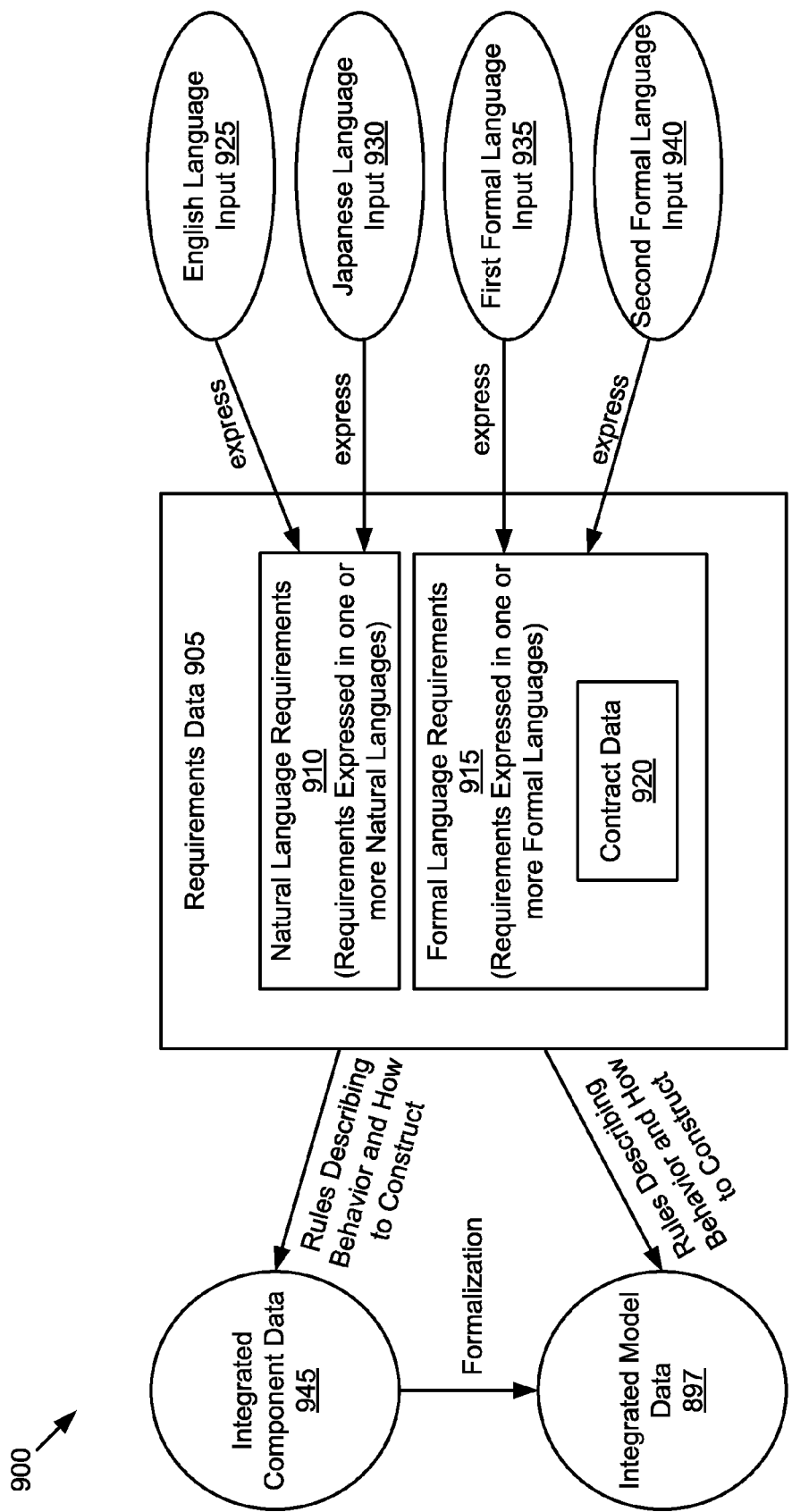
FIG. 9A is a block diagram including a graphical representation of an electronic device determining the integrated model data.

Turning now to FIG. 9A. FIG. 9A is a block diagram including a graphical representation 900 of an electronic device 800 determining the integrated model data 897. The integrated model data 897 may then be used by the electronic device 800 to determine an integrated system such as an embedded system for a vehicle. The integrated system may include one or more integrated models described by the integrated model data 897. By contrast, any integrated system formed from the prior art approach of FIG. 1A would not include integrated models described by the integrated model data 897. Instead, the integrated system of the prior art approach of FIG. 1A would include one or more integrated software components which are more complex than an integrated model as described by the integrated model data 897.

In some implementations, the system 800 described by FIG. 8A is a special-purpose computer configured to build an integrated system using the integrated model data 897 and then electronically analyze the integrated system against the formal specification data 191 or the relational data 193 to determine whether the integrated system conforms to the requirements of the first user 105 and the second user 106 (as indicated, for example, by the one or more contracts). This analysis would be impossible using the prior art approach described above in FIG. 1A for at least two example reasons: (1) the one or more integrated software components included in the integrated system of the prior art approach of FIG. 1A are too big and complex for computers to analyze; and (2) the required way for the one or more integrated software components to perform in the prior art approach of FIG. 1A is only defined by a natural language such as English or Japanese, and these natural languages are not understandable by computers.

The determination module 895 may beneficially improve the performance of the special-purpose computer 800 by using one or more integrated models, instead of integrated software components, to form the integrated system. An integrated model is less complex than an integrated software component. Moreover, the one or more integrated models described by the integrated model data 897 is formalized using a formal language (as described by the formal language data 899) which is understandable to the special-purpose computer 800. In this way, the integrated system formed from the integrated model data 897 may be analyzed and verified quickly by the determination module 895 of the special-purpose computer 800. The verification process provided by the determination module 895 may include isolating each of the one or more contracts included in the formal specification data 191 and each of the one or more integrated models included in the integrated system. The determination module 895 may determine the required construction and behavior of the one or more integrated models based on the one or more contracts. The determination module 895 may electronically analyze the construction and behavior of the one or more integrated models included in the integrated system to determine whether the construction and behavior of the one or more integrated models conform to the requirements described by the one or more contracts.

In FIG. 9A, the requirements data 905 may be an element of the formal specification data 191. The requirements data 905 may receive an English language input 925, a Japanese language input 930, a first formal language input 935 and a second formal language input 940. The English language input 925 and the Japanese language input 930 may describe the requirements 910 of the integrated system expressed in one or more natural languages (here, in this example embodiment, English and Japanese). The formal language requirements 915 may describe the natural language requirements 910 using one or more formal languages as described above with reference to element 899. In other words, the formal language requirements 915 are equivalent to the natural language requirements 910, however, the formal language requirements 915 are described using one or more formal languages whereas the natural language requirements 910 are described using one or more natural languages. The first formal language input 935 and the second formal language input 940 may describe these formal language requirements 915. The formal language requirements 915 may include contract data 920. The contract data 920 may describe the one or more contracts for the formal specification data 191.

The integrated component data 945 may describe one or more software components. The integrated component data 945 may be determined based on the natural language requirements 910, and as such, not understandable to the determination module 895.

The determination module 895 of the special-purpose computer 800 may determine the integrated model data 897 based on the formal language requirements data 915 and the contract data 920. The integrated model data 897 may be a formalization of the integrated component data 945. The arrow between the integrated model data 897 and the integrated component data 945 may graphically represent that the integrated model data 897 may be a formalization of the integrated component data 945.

Figure 9B:
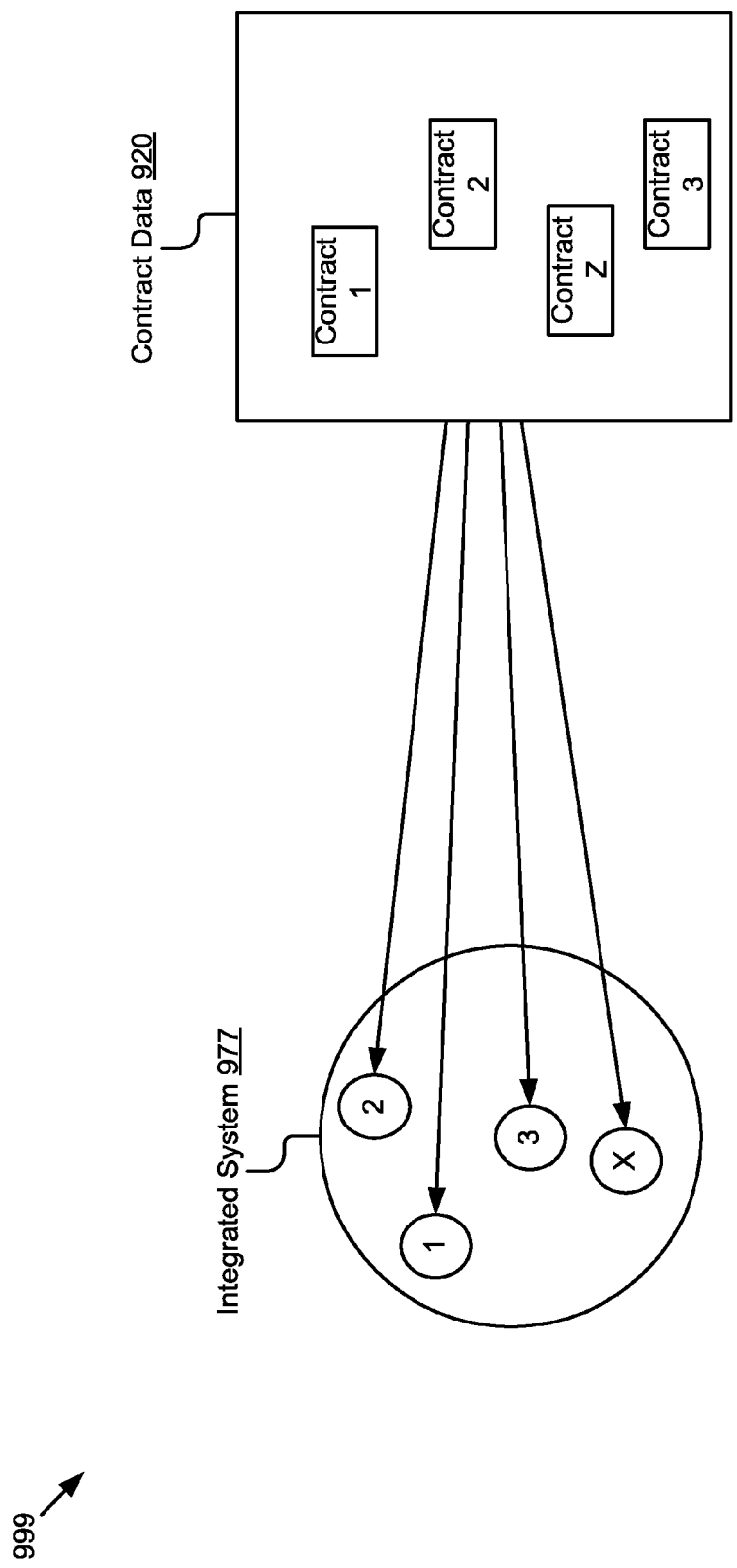
FIG. 9B is a block diagram including a graphical representation of an electronic device verifying that the integrated model data 897 conforms to the requirements of the contract data.

FIG. 9B is a block diagram including a graphical representation of an electronic device 800 verifying that integrated system 977 conforms to the requirements of the contract data 920.

The integrated system 977 may include one or more integrated models. The one or more integrated models are represented in this example by the characters "1," "2," "3" and "X" which correspond to "Integrated Model 1," "Integrated Model 2," "Integrated Model 3" and "Integrated Model X," respectively. "X" indicates that there may be any positive integer of integrated models included in the integrated system 977.

The contract data 920 may include one or more contracts. In this example, the contract data 920 includes "Contract 1,"

"Contract 2," "Contract 3" and "Contract Z." "Z" indicates that there may be any positive integer of contracts included in the contract data 920.

The integrated models of the integrated system 977 may be analyzed by the determination module 895 of the electronic device 800 to verify that the integrated models conform to the requirements of the contracts included in the contract data 920. The verification process provided by the determination module 895 may include (1) isolating each of the one or more contracts included in the contract data 920 and each of the one or more integrated models included in the integrated system 977. The determination module 895 may determine the required construction and behavior of the one or more integrated models based on the one or more contracts. The determination module 895 may electronically analyze the construction and behavior of the one or more integrated models included in the integrated system 977 to determine whether the construction and behavior of the one or more integrated models conforms to the requirements described by the one or more contracts of the contract data 920.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the implementations can be described above primarily with reference to user interfaces and particular hardware. However, the implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The implementations of the specification can also relate to a processor for performing one or more steps of the methods described above. The processor may be a special-purpose processor selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method of building an integrated system using a formal language, the method comprising:
designing one or more models for one or more software components to be included in the integrated system, wherein the one or more models describe one or more requirements for the one or more software components;
assigning one or more contracts to the one or more models, wherein the one or more contracts are written in the formal language and the one or more contracts include one or more low-level contracts and one or more high-level contracts;
integrating, by an electronic device, the one or more models based on the composition of the one or more contracts to form an integrated model, wherein the integrated model includes each requirement for the one or more software components which is described by the one or more models which form the integrated model; and
analyzing, by the electronic device, the one or more contracts and the integrated model to determine whether the one or more contracts include each requirement described by the integrated model, wherein the one or more low-level contracts are designed relative to the one or more high-level contracts so that analysis of the one or more low-level contracts alone indicates whether an error will be present in the one or more high-level contracts.

2. The method of claim 1, further comprising:
determining that the one or more contracts do not include at least one requirement described by the integrated model; and
revising the one or more contracts to include one or more requirements described by the integrated model.

3. The method of claim 2, further comprising:
analyzing the revised version of the one or more contracts and the integrated model to determine whether the revised version of the one or more contracts include each requirement described by the integrated model.

4. The method of claim 3, wherein the revised version of the one or more contracts may be iteratively revised until they include each requirement included in the integrated model.

5. The method of claim 1, wherein the integrated system includes an embedded system.

6. The method of claim 1, wherein the integrated system includes an embedded system included in a vehicle.

7. The method of claim 1, wherein the formal language does not include a natural language.

8. The method of claim 1, wherein the steps further comprise determining that the one or more contracts do not include at least one requirement described by the integrated model.

9. The method of claim 1, wherein the steps further comprise revising the one or more contracts to include one or more requirements described by the integrated model.

10. The method of claim 1, wherein each contract of the one or more contracts includes a model, an assumption and a guarantee.

11. A non-transitory computer-readable medium for building an integrated system using a formal language, the non-transitory computer-readable medium having computer instructions stored thereon that are executable by a processing device to perform or control performance of steps comprising:
designing one or more models for one or more software components to be included in the integrated system, wherein the one or more models describe one or more requirements for the one or more software components;
assigning one or more contracts to the one or more models, wherein the one or more contracts are written in the formal language and the one or more contracts include one or more low-level contracts and one or more high-level contracts;
integrating the one or more models based on the composition of the one or more contracts to form an integrated model, wherein the integrated model includes each requirement for the one or more software components which is described by the one or more models which form the integrated model; and
analyzing the one or more contracts and the integrated model to determine whether the one or more contracts include each requirement described by the integrated model, wherein the one or more low-level contracts are designed relative to the one or more high-level contracts so that analysis of the one or more low-level contracts alone indicates whether an error will be present in the one or more high-level contracts.

12. The non-transitory computer-readable medium of claim 11, wherein the steps further comprise:
determining that the one or more contracts do not include at least one requirement described by the integrated model; and
revising the one or more contracts to include one or more requirements described by the integrated model.

13. The non-transitory computer-readable medium of claim 12, wherein the steps further comprise analyzing the revised version of the one or more contracts and the integrated model to determine whether the revised version of the one or more contracts include each requirement described by the integrated model.

14. The non-transitory computer-readable medium of claim 13, wherein the revised version of the one or more contracts may be iteratively revised until they include each requirement included in the integrated model.

15. The non-transitory computer-readable medium of claim 11, wherein the integrated system includes an embedded system.

16. The non-transitory computer-readable medium of claim 11, wherein the integrated system includes an embedded system included in a vehicle.

17. The non-transitory computer-readable medium of claim 11, wherein the formal language does not include a natural language.

18. The non-transitory computer-readable medium of claim 11, wherein the steps further comprise determining that the one or more contracts do not include at least one requirement described by the integrated model.

19. The non-transitory computer-readable medium of claim 11, wherein the steps further comprise revising the one or more contracts to include one or more requirements described by the integrated model.

20. A system operable to build an integrated system using a formal language, the system comprising:
a processor programmed to perform steps comprising:
designing one or more models for one or more software components to be included in the integrated system, wherein the one or more models describe one or more requirements for the one or more software components;

assigning one or more contracts to the one or more models, wherein the one or more contracts are written in the formal language, wherein the one or more contracts include one or more low-level contracts and one or more high-level contracts and the one or more low-level contracts are designed relative to the one or more high-level contracts so that analysis of the one or more low-level contracts alone indicates whether an error will be present in the one or more high-level contracts;

integrating the one or more models based on the composition of the one or more contracts to form an integrated model, wherein the integrated model includes each requirement for the one or more software components which is described by the one or more models which form the integrated model; and analyzing the one or more contracts and the integrated model to determine whether the one or more contracts include each requirement described by the integrated model, wherein the one or more low-level contracts are designed relative to the one or more high-level contracts so that analysis of the one or more low-level contracts alone indicates whether an error will be present in the one or more high-level contracts.

* * * * *